Patented Feb. 12, 1946

2,394,581

UNITED STATES PATENT OFFICE 2,394,581

PYROLYSIS OF TETRAFLUOROETHYLENE POLYMER

Anthony F. Benning, Woodstown, and Frederick B. Downing, Carneys Point, N. J., and Joseph D. Park, Wilmington, Del., assignors to Kinetic Chemicals, Inc., Wilmington, Del., a corporation of Delaware No Drawing. Continuation of application Serial No. 484,314, April 23, 1943. This application October 4, 1943, Serial No. 504,952

8 Claims. (Cl. 260—648)

A. This invention relates to fluorinated carbon compounds and to processes of producing them by pyrolysis. Pyrolysis means the transformation of a substance by a process in which heat alone is the effective agent. This is a continuation of U. S. Serial No. 484,314, filed April 23, 1943.

B. It is an object of the invention to prepare new compounds. Another object of the invention is to prepare new and old compounds by a process which is technically and economically satisfactory and which is superior to known processes of producing those compounds which are old. Another object of the invention is to produce organic fluorine compounds and particularly to prepare perfluorinated hydrocarbons. Another object of the invention is to produce fluorinated compounds which previously had been made only by the use of elemental fluorine. Another object of the invention is to prepare lubricants particularly useful for systems in which a high differential pressure exists on the opposite sides of a friction joint. A particular object of the invention is to produce hexa-fluoro-cyclo-propane, having the empirical formula $C_3F_6$, and the structure:

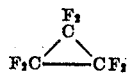

C. The objects of the invention are accomplished, generally speaking, by the pyrolysis of polymerized tetrafluoro-ethylene.

D. The process is carried out in general by heating poly-tetra-fluoro-ethylene in a closed system at a temperature high enough to produce a pyrolytic reaction but below that at which decomposition of the reaction products occurs. In general, temperatures from about 450° C. to 700° C. have been found useful, with a very efficient reaction occurring between 570° to 630° C. The polymer of tetra-fluoro-ethylene in the following examples sintered at about 500° C. Different polymers of tetra-fluoro-ethylene may have different characteristics and the temperature will be selected to produce the optimum results in view of those characteristics.

E. The reaction is carried out in an apparatus whose materials are substantially inert to the reaction and the reaction products. It may be carried out satisfactorily in the presence of an inert gas, such as nitrogen, and may also be carried out in the presence of chlorine.

F. Elevated and reduced pressures may be used wherever they will produce increased efficiency of reaction. In general, the reactions proceed efficiently at atmospheric pressure.

G. The following examples, in which the parts are by weight, will serve to illustrate how the invention may be practiced, it being understood that the process is susceptible of wide variation within the scope of the general discussion as hereinbefore set forth, particularly in regard to the nature of the reactants, the length of time of heating, the temperature, pressure, and the exact method of manipulation.

*Example I*

About 33 parts of granular tetra-fluoro-ethylene polymer were fed intermittently into a platinum-lined Inconel-jacketed nickel tube, 0.75" x 18" long at a rate of about 15 parts per hour. The tube temperature was maintained at about 575° C. over a length of 12" by electrical heating. The pyrolysis products were first passed through a trap for solids and the vapors condensed in a carbonice-acetone trap backed by a liquid nitrogen trap. A lower melting solid polymer trapped in the first trap had a melting range of 70–300° C. The liquid condensates were washed with water, dried and condensed. The crude organic product (33 parts) had the following composition:

| | B. P., °C. | Weight percent (based on polymer used) |
|---|---|---|
| $C_2F_4$ | −76 | 6 |
| $C_3F_6$ | −28 | 39 |
| $C_4F_8$ | −5 | 43 |
| Low melting polymers; melting range 70–300° C. | | 11 |

*Example II*

One hundred and forty parts of tetra-fluoro-ethylene polymer were fed intermittently into an Inconel tube 1" x 26" long, at a rate of about 40 parts per hour. A tube temperature of 580–620° C. was maintained. (This temperature was measured with a thermocouple wrapped outside of the pyrolysis tube.) A steady flow of about 1–2 liters per hour of nitrogen was passed through the tube during the pyrolysis. The pyrolysis products were first passed through a 2-liter flask which acted as a trap for solids and then through a receiver cooled in carbonice-acetone and backed by a liquid nitrogen-cooled trap. About 130 parts of pyrolysis products were obtained. This represented an organic recovery of about 93%.

The liquid condensates were washed, dried and analyzed. The composition of the pyrolysis products were as follows:

|  | B. P., °C. | Weight percent (based on polymer used) |
|---|---|---|
| $C_2F_4$ | −76 | 26.5 |
| $C_3F_6$ | −28 | 15 |
| $C_4F_8$ | −5 | 33 |
| Fraction IV | | 3 |
| Low melting polymer | | 15 |
| Loss | | 7 |

Example III

About 436 parts of heat-treated tetra-fluoro-ethylene polymer (granular polymer was first molded in the cold and then subjected to about 2000 p. s. i. abs. at 320° C. for about half an hour) were pyrolyzed under conditions similar to that described in Example II.

The pyrolysis products obtained did not differ materially from the composition of the products obtained in Example II.

Example IV

A similar pyrolysis was carried out in a steel tube 1″ x 26″ long, at a tube temperature of 620–630° C., at a rate of about 40 parts of tetra-fluoro-ethylene polymer per hour. Carbonization was evident and the pyrolysis products had the following composition:

|  | B. P., °C. | Weight percent (based on polymer used) |
|---|---|---|
| $C_2F_4$ | −76 | 24 |
| $C_3F_6$ | −28 | 28.5 |
| $C_4F_8$ | −5 | 13.5 |
| $C_5F_{10}$ | 23 | 4.4 |
| 40° C. and above | | 2.2 |
| Lower melting polymer | | 7.4 |
| Organic recovery | | 80 |

Example V

About 70 parts of tetra-fluoro-ethylene polymer and 70 parts of chlorine were fed per hour into an Inconel tube heated to 630° C. The pyrolysis products were first led through a trap for solids, then through receivers cooled in carbonice-acetone and in liquid nitrogen. The liquid condensates were then later washed (to remove excess chlorine), dried, and analyzed. A total of 79 parts of pyrolysis product was recovered. The following composition was obtained:

|  | B. P., °C. | Weight percent (based on total recovered) |
|---|---|---|
| $C_2F_4$ | −76 | 21 |
| "x" | −28 to −29 | 40 |
| $C_4F_8$ | −5 | 8.2 |
| $C_2Cl_2F_4$ | 3–4 | 12.8 |
| High boilers | Up to 90 | 7 |
| Low melting polymers | 100 to 300 | 7 |

H. The process which has been hereinbefore described and illustrated is a most efficient method of producing carbon-ring compounds saturated with fluorine. These compounds have the general formula $C_nF_{2n}$, a number of which have been made by methods of the prior art, but others of which are new. Particularly notable among the new compounds which are formed are $C_3F_6$ and $C_4F_8$, otherwise known as hexa-fluoro-cyclo-propane and octo-fluoro-cyclo-butane, respectively. $C_3F_6$ is claimed in this application and $C_4F_8$ is claimed in an application of Downing, Benning and McHarness, Serial No. 535,208, filed May 11, 1944. In addition to the compounds of this homologous series, there have been produced certain polymeric substances having a melting range between 70°–300° C., the precise structures of which, due in part to the difficulty in determining polymeric structures, have not been determined. All of these polymeric compounds are new and useful in the field of plastics and are claimed herein. These low-melting polymers have a putty-like consistency, are insoluble in the usual organic solvents such as $CCl_4$, $CHCl_3$, petroleum ether, octane, benzene, methanol, concentrated caustic alkalis, inorganic acids and hot concentrated mineral acids. The low-melting polymers are homogeneous and possess good lubricating qualities. They have been used as lubricants for friction joints through which organic and inorganic liquids were passed at elevated temperatures and high vacuum, and, when so used, have maintained the seal without breaking. For example, glass and metal stop cocks and valves have been coated with the polymers and the seal so formed has proved highly effective. They have also been used as a sealing material for a glass ball-and-socket joint between a distillation flask and a reflux column in a vacuum system in which the sealing compounds were exposed to organic substances heated to more than 200° C. under a pressure of less than 1 mm. This extreme pressure differential had no effect upon the seal. These low-melting polymers are useful as protective coating for metal, glass and other surfaces and for the lubrication of moving parts, particularly where those parts are exposed to solvents or other active chemicals.

I. In the following table is a list of pure compounds which have been isolated from the pyrolysis of poly-tetra-fluoro-ethylene and identified.

Table I

[Pure compounds isolated from the pyrolysis of tetra-fluoro-ethylene polymer]

| Compound | B. P. (lit.) | °C. (found) | Molecular weight Calc. | Molecular weight Found |
|---|---|---|---|---|
| 1. $C_2F_4$ | −76 | −76 | 100 | 101 |
| 2. $C_3F_6$ | | −28 | 150 | 153 |
| 3. $C_4F_8$ | | −5 | 200 | 204 |
| 4. $C_5F_{10}$ | 23 | 23 | 250 | |
| 5. $C_6F_{12}$ | 51 | 51–53 | 300 | |
| 6. $C_7F_{14}$ | 80 | 80–82 | | |

Lower melting polymers were also found which had a melting range of 70° to 300° C.

J. The compound, $C_2F_4$, was identified through its boiling point, molecular weight, and through the formation of the known dibromide $C_2F_4Br_2$, boiling at 47.6° C.

K. $C_3F_6$ was identified through its molecular weight (vapor density at 22° C. and 647 mm.—5.4 g. per liter; M.W. found: 153; calc.: 150); and chlorination with elemental chlorine in the vapor phase in the presence of light to the known compound $Cl(CF_2)_3Cl$, boiling at about 35° C. Fluorination of $C_3F_6$ with $SbF_5$ yielded a small amount of the known compound $C_3F_8$, boiling at −36° C. The new compound, $C_3F_6$, did not decolorize a solution of bromine in $CCl_4$ although it decolorized permanganate solution. On this basis a cyclic structure is assigned to this compound.

L. $C_4F_8$ was identified through its molecular weight (vapor density at 22° C. and 757 mm.—8.44 g. per liter; M.W. found: 204; calc. 200). This compound did not decolorize a solution of bromine when the mixture was exposed to sunlight in a gas pressure flask. $SbF_5$ was without effect on $C_4F_8$ even after prolonged heating at 160° C. This very stable compound is identical with the compound previously isolated as a component of one of the constant-boiling mixtures obtained in the pyrolysis of $CHClF_2$. A cyclic structure is also assigned to this compound.

M. In Example II there is a fraction called "Fraction IV," which was itself separated into three fractions which appeared, by comparison of boiling points only, to have the constitutions: $C_5F_{10}$: +23°C; $C_6F_{12}$: +51–53° C.; $C_7F_{14}$: +80° C.; residue about 90–130° C. None of those fractions decolorized bromine solution in carbon tetrachloride and they appeared in general to correspond to similar compounds of like empirical formula which had previously been prepared by the action of elemental fluorine on carbon or benzene.

N. Most of the products of the reaction are possessed of outstanding thermal and chemical stability and, because of their properties are useful for a variety of commercial purposes, such as solvents, reaction media, heat-transfer media and for power generation. Many of them are non-corrosive and generally non-toxic. They are, consequently, desirable for use as refrigerants and as intermediates for the making of completely fluorinated compounds. The new low-melting polymers are quite inert to chemical reagents.

O. This process invention is an easy and inexpensive method of producing perfluorinated compounds which heretofore have been produced only with great difficulty and with poor yields through the use of elemental fluorine.

P. As many apparently widely different embodiments of this invention may be made without departing from the spirit and scope thereof, it is to be understood that we do not limit ourselves to the specific embodiments thereof except as defined in the appended claims.

We claim:

1. The compound having the empirical formula $C_3F_6$, a boiling point about −28° C., and a vapor density of 5.4 g. per liter at 647 mm. pressure and 22° C.

2. The process which comprises heating a polymer of tetrafluoroethylene in the presence of chlorine at a temperature of about 630° C. and separating the reaction products.

3. The process which comprises heating polymerized tetrafluoroethylene to a temperature of from about 500° C. to about 700° C. for a period of time sufficient to cause pyrolysis of the polymerized tetrafluoroethylene and separating the pyrolysis products.

4. The process which comprises heating polymerized tetrafluoroethylene to a temperature of from about 500° C. to about 700° C. in an inert reaction chamber for a period of time sufficient to cause pyrolysis of the polymerized tetrafluoroethylene and the formation of a substantial proportion of compounds of the formula $C_nF_{2n}$, wherein $n$ represents an integer of at least 2, and separating compounds of the formula $C_nF_{2n}$ from the reaction mixture.

5. The process which comprises heating polymerized tetrafluoroethylene to a temperature of from about 500° C. to about 700° C. in an inert reaction chamber in the presence of an inert gas for a period of time sufficient to cause pyrolysis of the polymerized tetrafluoroethylene and the formation of a substantial proportion of compounds of the formula $C_nF_{2n}$, wherein $n$ represents an integer of at least 2, and separating compounds of the formula $C_nF_{2n}$ from the reaction mixture.

6. The process which comprises heating polymerized tetrafluoroethylene to a temperature of from about 500° C. to about 700° C. in an inert reaction chamber for a period of time sufficient to cause pyrolysis of the polymerized tetrafluoroethylene and the formation of a substantial proportion of a compound of the formula $C_3F_6$ and separating the compound of the formula $C_3F_6$ from the reaction mixture.

7. The process which comprises heating polymerized tetrafluoroethylene to a temperature of from about 500° C. to about 700° C. in an inert reaction chamber for a period of time sufficient to cause pyrolysis of the polymerized tetrafluoroethylene and the formation of a substantial proportion of a compound of the formula $C_2F_4$ and separating the compounds of the formula $C_2F_4$ from the reaction mixture.

8. The process which comprises heating polymerized tetrafluoroethylene to a temperature of from about 500° C. to about 700° C. in an inert reaction chamber for a period of time sufficient to cause pyrolysis of the polymerized tetrafluoroethylene and the formation of a substantial proportion of compounds boiling from about −76° C. to about 82° C. and having the formula $C_nF_{2n}$, wherein $n$ represents an integer of at least 2, and low melting polymers having a melting range between 70° C. and 300° C., and separating from the reaction mixture compounds of the formula $C_nF_{2n}$ and the low melting polymers in separate fractions.

ANTHONY F. BENNING.
FREDERICK B. DOWNING.
JOSEPH D. PARK.